United States Patent
Etzel et al.

(10) Patent No.: US 10,638,775 B2
(45) Date of Patent: *May 5, 2020

(54) METHODS AND COMPOSITIONS INVOLVING WHEY PROTEIN ISOLATES

(71) Applicant: Wisconsin Alumni Research Foundation, Madison, WI (US)

(72) Inventors: Mark R. Etzel, Madison, WI (US); Thatcher Root, Madison, WI (US); Abhiram Arunkumar, Cambridge, MA (US); Seyhun Gemili, Bedminster, NJ (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,196

(22) Filed: Aug. 3, 2018

(65) Prior Publication Data

US 2018/0343890 A1    Dec. 6, 2018

Related U.S. Application Data

(63) Continuation of application No. 13/181,234, filed on Jul. 12, 2011.

(60) Provisional application No. 61/365,653, filed on Jul. 19, 2010.

(51) Int. Cl.
*A23J 1/20* (2006.01)
*A23J 3/08* (2006.01)

(52) U.S. Cl.
CPC .............. *A23J 1/205* (2013.01); *A23J 3/08* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 4,824,568 A | 4/1989 | Allegrezza et al. |
| 4,849,106 A | 7/1989 | Mir |
| 7,001,550 B2 | 2/2006 | van Reis |
| 2002/0185440 A1 | 12/2002 | Martin |
| 2003/0178368 A1 | 9/2003 | van Reis |
| 2005/0197496 A1 | 9/2005 | Perreault |
| 2008/0017576 A1 | 1/2008 | Belfort et al. |

OTHER PUBLICATIONS

"Millipore Technical Library—Frequently Asked Questions: How should I select the appropriate Molecular Weight Cutoff (MWCO) for Amicon Ultra?" EMD Millipore Corporation website (www.millipore.com), located at http://www.millipore.com/faqs/tech1/5931k2, downloaded Jul. 8, 2013.

"Ultrafiltration fundamentals," Pall Corporation website (www.pall.com), located at http://www.pall.com/main/laboratory/litemture-library-details.page?id=35486, downloaded Jul. 8, 2013.

(Continued)

*Primary Examiner* — D. Lawrence Tarazano
*Assistant Examiner* — Philip A Dubois
(74) *Attorney, Agent, or Firm* — Joseph T. Leone, Esq.; DeWitt LLP (57) ABSTRACT

The present invention concerns methods of isolating milk proteins. Methods of the invention include charged ultrafiltration processes that use variations in pH to further separate protein species.

17 Claims, 9 Drawing Sheets

(56) References Cited

OTHER PUBLICATIONS

Bhusan and Etzel, "Charged ultrafiltration membranes increase the selectivity of whey protein separations," J. Food Science, 74(3):E131-139, 2009.
Lucas et al., "Extraction of alpha-lactalbumin from whey protein concentrate with modified inorganic membranes," *J. Membrane Science,* 148(1):1-12, 1998.
Office Action issued in European Application No. 11739219.1, dated May 22, 2015.
Office Action issued in European Application No. 11739219.1, dated Mar. 22, 2016.
Office Action issued in U.S. Appl. No. 13/181,234, dated Apr. 12, 2012.
Office Action issued in U.S. Appl. No. 13/181,234, dated Feb. 26, 2015.
Office Action issued in U.S. Appl. No. 13/181,234, dated Jun. 5, 2018.
Office Action issued in U.S. Appl. No. 13/181,234, dated May 28, 2014.
Office Action issued in U.S. Appl. No. 13/181,234, dated Nov. 8, 2012.
Office Action issued in U.S. Appl. No. 13/181,234, dated Nov. 18, 2016.
Office Action issued in U.S. Appl. No. 13/181,234, dated Sep. 11, 2015.
Office Action issued in U.S. Appl. No. 13/181,234, dated Sep. 14, 2017.
PCT International Preliminary Report on Patentability issued in International Application No. PCT/US2011/043834, dated Jan. 31, 2013.
PCT International Search Report and Written Opinion issued in International Application No. PCT/US2011/043834, dated Oct. 21, 2011.
Sarkar et al., "Electric field enhance fractionation of protein mixture using ultrafiltration," J. Membrane Science, 341:11-20, 2009.

METHODS AND COMPOSITIONS INVOLVING WHEY PROTEIN ISOLATES

This application is a continuation of U.S. application Ser. No. 13/181,234, filed Jul. 12, 2011, which claims benefit of priority to U.S. Provisional Application No. 61/365,653, filed Jul. 19, 2010, the entire contents of each of which are hereby incorporated by reference.

BACKGROUND OF THE INVENTION

1. Field of the Invention

The present invention relates generally to the field of protein chemistry. More particularly, it provides a process of separating milk proteins using charged ultrafiltration.

2. Description of Related Art

Purified dairy proteins have special, value-added utility in processed foods and medical foods. For example, glycomacropeptide (GMP) is a protein present in cheese whey that is the only protein in nature that is safe to eat for individuals with phenylketonuria. Alpha-lactalbumin (ALA) is a protein present in milk and whey that has utility in infant formula; mother's milk has 130% more ALA than cow's milk. Furthermore, ALA has 4 times more tryptophan (Trp) than an average whey protein. Trp is a precursor to the neurotransmitter serotonin in the brain that controls appetite, depression, mood, and sleep.

The value of purified dairy proteins is much greater than a mixture of the dairy proteins. For example, whey protein isolate is a mixture of whey proteins and sells for about $10/kg. GMP sells for about $70/kg and ALA for about $50/kg. Thus, there is a human need and economic benefit to the fractionation of dairy proteins.

Chromatography has been used traditionally to fractionate dairy proteins. Ion exchange chromatography is used to manufacture GMP and ALA from whey. Chromatography is expensive and not environmentally friendly because of the need for sophisticated chromatography systems and the disposal of waste water and buffers. The dairy industry has been slow to adopt chromatography for these reasons and because it is unfamiliar to production personnel. The inventor has examined the use of positively-charged membranes to increase the selectivity of ultrafiltration and allow the fractionation of proteins from cheese whey. By adding a positive charge to ultrafiltration membranes, and adjusting the solution pH, it was possible to permeate proteins having little or no charge, such as glycomacropeptide, and retain proteins having a positive charge. Placing a charge on the membrane increased the selectivity by over 600% compared to using an uncharged membrane. The data were fit using the stagnant film model that relates the observed sieving coefficient to membrane parameters such as the flux, mass transfer coefficient, and membrane Peclet number. However, this approach was not tested for other species, such as those in milk, nor in the context of large scale separation. Thus, improved industrial methods for separating milk proteins are needed.

SUMMARY OF THE INVENTION

Thus, in accordance with the present invention, there is provided a method for fractionating a protein mixture comprising multiple protein species to obtain a protein of interest comprising (a) adjusting the pH of said protein mixture based on the isoelectric point of said protein of interest, thereby rendering a net charge of about zero on said protein of interest, (b) adjusting the conductivity of said protein mixture such that shielding of said multiple species other than said protein of interest is limited to the extent that said multiple species other than said protein of interest are rejected by a charged ultrafiltration membrane; (c) contacting said mixture with said charged ultrafiltration membrane to achieve a first permeate and a first retentate, wherein said ultrafiltration membrane has a pore size at least 100 kDa above, or 10× greater than, at least one of said multiple species other than said protein of interest, wherein said first permeate comprises an increased ratio of said protein of interest as compared to said protein mixture. The protein mixture may be a milk protein or a whey protein mixture. The charged ultrafiltration may be effected by an ultrafiltration membrane having a pore size rating of 150-500 kDa, such as 150 kDa, 175 kDa, 200 kDa, 250 kDa, 300 kDa, 350 kDa, 400 kDa, 450 kDa or 500 kDa. The protein mixture may comprise one or more of glycomacropeptide (GMP), alpha-lactalbumin (ALA), immunoglobulin G (IgG), and/or beta-lactoglobulin (BLG).

The method method may further comprise subjecting said first permeate to a second charged ultrafiltration to achieve a second permeate and a second retentate, and the second retentate may be recycled into another protein mixture for additional charged ultrafiltration. The method may also further comprise subjecting said first retentate to a second charged ultrafiltration to achieve a second retentate and a second permeate, and wherein said second permeate may be recycled into another protein mixture for additional charged ultrafiltration. The ultrafiltration may achieve a purity of about 60%, 65%, 70%, 75%, 80%, 85%, 90%, 95% and 99%, and may achieve a purity of about 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%. The method may be effected by a multistage crossed-flow positively-charged of ultrafiltration membrane.

The ultrafiltration membrane may be positively-charged or negatively-charged. The method may further comprise adjusting the pH of said protein mixture to minimize the charge on said protein of interest, such as pH 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, or 9.0, and in particular, pH 3-6, 3-5, 3-4, 4-6, 5-6, or 4-5. The method may further comprise adjusting the conductivity of said protein mixture to 3-10 mS/cm, including 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0 mS/cm, and in particular, 3-10, 3-9, 3-8, 3-7, 3-6, 3-5, 3-4, 4-10, 5-10, 6-10, 7-10, 8-10, or 9-10. The proteins separated may be GMP from ALA, GMP from IgG, GMP from BLG, ALA from IgG, ALA from BLG, or BLG from IgG. In some embodiments the methods of the invention involve implementing separation of proteins in a batch process. The term "batch" is used according to its ordinary and plain meaning in this field to refer to a process in which components of the purification process are incubated together, generally without regard to order or direction.

It is contemplated that any method or composition described herein can be implemented with respect to any other method or composition described herein. Moreover, it is clearly contemplated that embodiments may be combined with one another, to the extent they are compatible.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value.

It is specifically contemplated that any embodiments described in the Examples section are included as an embodiment of the invention.

Following the long-standing patent law convention, the words "a" and "an," when used in conjunction with the word "comprising" in the claims or specification, denotes one or more, unless specifically noted.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The present inventors have discovered that charged ultrafiltration membranes can be used to make dairy protein fractions of chromatographic purity without the need for sophisticated chromatography equipment or water or buffers. The invention can be practiced using ultrafiltration membrane systems common in essentially every dairy processing facility worldwide. The inventors made the surprising discovery that charged ultrafiltration membranes having a pore size rating of 150-500 kDa can be used to fractionate dairy proteins much smaller in size such as GMP (8.6 kDa), ALA (14.4 kDa), and beta-lactoglobulin (18.6 kDa). They also found that high purity and yield can be attained by operation of the membranes in stages analogous to plates in a distillation column.

I. PROTEINACEOUS COMPOSITIONS

In certain embodiments, the present invention concerns protein compositions comprising at least one proteinaceous molecule, such as a whey protein. As used herein, a "proteinaceous molecule," "proteinaceous composition," "proteinaceous compound," "proteinaceous chain" or "proteinaceous material" generally refers, but is not limited to, a protein of greater than about 50 amino acids or the full length endogenous sequence translated from a gene; a polypeptide of greater than about 100 amino acids; and/or a peptide of from about 3 to about 100 amino acids. All the "proteinaceous" terms described above may be used interchangeably herein.

A. Milk Proteins

There are several types of proteins in milk. The major milk proteins are unique to milk—not found in any other tissue. Milk proteins, particularly caseins, have an appropriate amino acid composition for growth and development of the young. Other proteins in milk include an array of enzymes, proteins involved in transporting nutrients, proteins involved in disease resistance (antibodies and others), growth factors, etc.

The total protein component of milk is composed of numerous specific proteins. The primary group of milk proteins are the caseins. There are 3 or 4 caseins in the milk of most species; the different caseins are distinct molecules but are similar in structure. All other proteins found in milk are grouped together under the name of whey proteins. The major whey proteins in cow milk are beta-lactoglobulin and alpha-lactalbumin.

The major milk proteins, including the caseins, beta-lactoglobulin and alpha-lactalbumin, are synthesized in the mammary epithelial cells and are only produced by the mammary gland. The immunoglobulin and serum albumin in milk are not synthesized by the epithelial cells. Instead, they are absorbed from the blood (both serum albumin and the immunoglobulins). An exception to this is that a limited amount of immunoglobulin is synthesized by lymphocytes which reside in the mammary tissue (called plasma cells). These latter cells provide the mammary gland with local immunity. Milk proteins can be identified by molecular mass. The relative size of the caseins (~25-35 kDa) is distinguished from the major whey proteins beta-lactoglobulin (18 kDa) and alpha-lactalbumin (14 kDa). Others include primarily lactoferrin (~80 kDa) and serum albumin (~66 kDa).

B. Caseins

Caseins have an appropriate amino acid composition that is important for growth and development of the nursing young. This high quality protein in cow milk is one of the key reasons why milk is such an important human food. Caseins are highly digestible in the intestine and are a high quality source of amino acids. Most whey proteins are relatively less digestible in the intestine, although all of them are digested to some degree. When substantial whey protein is not digested fully in the intestine, some of the intact protein may stimulate a localized intestinal or a systemic immune response. This is sometimes referred to as milk protein allergy and is most often thought to be caused by ß-lactoglobulin. Milk protein allergy is only one type of food protein allergy.

Caseins are composed of several similar proteins which form a multi-molecular, granular structure called a casein micelle. In addition to casein molecules, the casein micelle contains water and salts (mainly calcium and phosphorous). Some enzymes are associated with casein micelles as well. The micellar structure of casein in milk is an important part of the mode of digestion of milk in the stomach and intestine, the basis for many of the milk products industries (such as the cheese industry), and the basis for the ability to easily separate some proteins and other components from cow milk. Casein is one of the most abundant organic components of milk, in addition to the lactose and milk fat. Individual molecules of casein alone are not very soluble in the aqueous environment of milk. However, the casein micelle granules are maintained as a colloidal suspension in milk. If the micellar structure is disturbed, the micelles may come apart and the casein may come out of solution, forming the gelatinous material of the curd. This is part of the basis for formation of all non-fluid milk products like cheese.

Caseins are highly digestible in the intestine and are a high quality source of amino acids. Most whey proteins are relatively less digestible in the intestine, although all of them are digested to some degree. When substantial whey protein is not digested fully in the intestine, some of the intact protein may stimulate a localized intestinal or a systemic immune response. This is sometimes referred to as milk protein allergy and is most often thought to be caused by ß-lactoglobulin. Milk protein allergy is only one type of food protein allergy.

C. Whey Proteins

Whey proteins comprise one of the two major protein groups of bovine milk and account for approximately 20% of the milk composition. However, the present invention is not limited to whey protein from bovine milk and can be implemented with respect to the milk from other species. Whey protein is derived as a natural byproduct of the cheese-making process. In addition to proteins, the raw form contains fat, lactose and other substances. The raw form is processed to produce protein-rich whey protein concentrates (WPC) and whey protein isolates (WPI), among other things. Thus, whey proteins are comprised of high-biological-value proteins and proteins that have different functions. The primary whey proteins are beta-lactoglobulin and alpha-lactalbumin, two small globular proteins that account for about 70 to 80% of total whey protein. Proteins present in lesser amounts include the immunoglobulins IgG, IgA and IgM, but especially IgG, glycomacropeptides, bovine serum albumin, lactoferrin, lactoperoxidase and lysozyme.

There are many whey proteins in milk and the specific set of whey proteins found in mammary secretions varies with the species, the stage of lactation, the presence of an intramammary infection, and other factors. The major whey proteins in cow milk are beta-lactoglobulin and alpha-lactalbumin. Alpha-lactalbumin is an important protein in the synthesis of lactose and its presence is central to the process of milk synthesis. beta-lactoglobulin's function is not known. Other whey proteins are the immunoglobulins (antibodies; especially high in colostrum) and serum albumin (a serum protein). Whey proteins also include a long list of enzymes, hormones, growth factors, nutrient transporters, disease resistance factors, and others.

D. Milk Serum Proteins

Microfiltration of milk removes the casein micelles in the retentate and leaves the non-casein proteins of milk in the permeate. When the caseins are removed from milk without making cheese, the remaining proteins are comprised of the proteins found in whey with the exception of glycomacropeptide. The action of rennet or chymosin on kappa-casein cleaves off the hydrophilic glycomacropeptide, leaving the hydrophobic para-kapa-casein to coagulate and form cheese curd. When this enzymatic cleavage does not occur, glycomacropeptide generation also does not occur. Thus, the proteins in the milk microfiltration permeate are called milk serum proteins instead of whey proteins to highlight the distinction in composition, namely the absence of glycomacropeptide in milk serum proteins.

II. ULTRAFILTRATION

Ultrafiltration (UF) is a variety of membrane filtration in which hydrostatic pressure forces a liquid against a semipermeable membrane. Suspended solids and solutes of high molecular weight are retained, while water and low molecular weight solutes pass through the membrane. This separation process is used in industry and research for purifying and concentrating macromolecular ($10^3$-$10^6$ Da) solutions, especially protein solutions. Ultrafiltration is not fundamentally different from microfiltration or nanofiltration, except in terms of the size of the molecules it retains. Ultrafiltration is applied in cross-flow or dead-end mode and separation in ultrafiltration undergoes concentration polarization.

Ultrafiltration systems eliminate the need for clarifiers and multimedia filters for waste streams to meet critical discharge criteria or to be further processed by wastewater recovery systems for water recovery. Efficient ultrafiltration systems utilize membranes which can be submerged, backflushable, air scoured, spiral wound UF/MF membrane that offers superior performance for the clarification of wastewater and process water. There are a number of different formats of ultrafiltration membrane geometries:

Spiral wound module: consists of large consecutive layers of membrane and support material rolled up around a tube; maximizes surface area; less expensive, however, more sensitive to flux decline caused by accumulation of solutes on the membrane.

Tubular membrane: Feed solution flows through the membrane lumen and the permeate is collected in the tubular housing; generally used for viscous or crude fluids; system is not very compact and has a high cost per $m^2$ installed.

Hollow fiber membrane: Modules contain several small (0.6 to 2 mm diameter) tubes or fibers; feed solution flows through the lumens of the fibers and the permeate is collected in the cartridge area surrounding the fibers; filtration can be carried out either "inside-out" or "outside-in."

Module Configurations Include:

Pressurized system or pressure-vessel configuration: TMP (transmembrane pressure) is generated in the feed stream by a pump, while the permeate stays at lower pressure closer to atmospheric pressure. Pressure-vessels are generally standardized, allowing the design of membrane systems to proceed independently of the characteristics of specific membrane elements.

Immersed system: Membranes are suspended in basins containing the feed and open to the atmosphere. Pressure on the influent side is limited to the pressure provided by the feed column. TMP is generated by a pump that develops suction on the permeate side. Ultrafiltration, like other filtration methods can be run as a continuous or batch process.

A negatively-charged membrane can be obtained by sulfonation of polysulfone, and a positively-charged polymer can be synthesized by chloromethylation of polysulfone and then by quaternization of the amino group. U.S. Patent Publication 2003/0178368 A1 teaches how to make a charged cellulosic filtration membrane by covalently modifying the membrane's surfaces with a charged compound or a compound capable of being chemically modified to possess a charge. For example, a cellulosic (cellulose, cellulose di- or tri-acetate, cellulose nitrate or blends thereof) membrane has hydroxyl moieties that are derivitized to form the charged surfaces. A wide variety of compounds can be used. Most possess a halide moiety capable of reacting with the membrane surface (including the interior of its pores) as well as a hydroxyl moiety capable of reacting with a second ligand that imparts the charge, positive or negative. U.S. Pat. No. 4,824,568 teaches casting a polymeric coating onto a membrane's surface and then cross-linking it in place with UV light, electron beam or another energy source to input a charge to the membrane such as PVDF, polyethersulfone, polysulfone, PTFE resin and the like. Examples of charged membranes are also found in U.S. Pat. No. 4,849,106 and U.S. Patent Publication 2002/0185440.

III. ADJUSTING PH TO EFFECT PERMEATION

Adjusting the pH of the protein mixture feed stream to the charged ultrafiltration membrane is key to fractionation of proteins. Fractionation requires that one protein permeate the membrane more than another protein. Charged ultrafiltration is different than traditional ultrafiltration in that the charge of the protein relative to the charge of the membrane is a key factor in addition to the size of the protein relative to the pore size of the membrane. Generally, when the pH of the solution is less than the isoelectric point (pI) of a protein, then the protein has a net positive charge. Conversely, when the pH is above the isoelectric point, then the protein has a net negative charge. In order for a charged ultrafiltration membrane to permeate a protein of interest and not the other proteins in the mixture it is desired to have the protein of interest be relatively smaller and uncharged compared to the other proteins.

For example, milk serum proteins can be made by microfiltration of milk to remove the caseins. The milk serum protein contains predominately the proteins alpha-lactalbumin and beta-lactoglobulin. Alpha-lactalbumin is smaller (14.4 kDa) than beta-lactoglubulin (18.6 kDa) and is more acidic (pI 4.4) than beta-lactoglobulin (pI 5.1). By adjusting the milk serum protein to about pH 4.0 to 4.5, the alpha-lactalbumin has little to no net charge while the beta-lactoglobulin has a net charge that is positive. The larger beta-lactoglobulin will be subject to electrostatic repulsion by a positively-charged ultrafiltration membrane while the smaller alpha-lactalbumin that has little to no net charge can permeate the charged ultrafiltration membrane.

In another example, cheese whey contains predominately glycomacropeptide, alpha-lactalbumin, and beta-lactoglobulin. Glycomacropeptide is smaller (8.6 kDa) and more acidic (pI<3.8) than the other whey proteins. By adjusting the whey to pH 3 to 4, the glycomacropeptide has little to no net charge while alpha-lactalbumin and beta-lactoglobulin have a net charge that is positive. At pH 3 to 4, the other proteins in whey that are larger than glycomacropeptide will be subject to electrostatic repulsion by a positively-charged ultrafiltration membrane while glycomacropeptide is not. Thus, adjusting the whey to pH 3 to 4 effects the permeation of glycomacropeptide.

IV. ADJUSTING CONDUCTIVITY TO MINIMIZE SHIELDING

Increasing the conductivity of the protein mixture increases shielding of the charges on the proteins. As conductivity increases to above about 100 mS/cm, charge shielding is great enough to negate the effect of electrostatic repulsion. This is undesirable because it takes away the advantages of charged ultrafiltration membranes compared to traditional ultrafiltration membranes. Conversely, lowering the conductivity is undesirable for dairy protein fractionation because milk and whey have a natural conductivity of about 3 to 10 mS/cm. Lowering the conductivity by diafiltration or electrodialysis is expensive.

Dissolving the dry dairy proteins in a dilute buffer solution is another commonly used method to adjust the pH and operate at low conductivity. This is undesirable however, because buffer salts are expensive and a hazard to the environment. Furthermore, drying the dairy proteins is expensive, and adding water and buffer to the dry proteins prior to fractionation by charged ultrafiltration is an unnecessary and imprudent extra step. It is desired to fractionate dairy proteins from the milk or whey or milk serum protein stream without the addition of buffer salts or the adjustment of the milk or whey to a conductivity substantially lower than the natural value.

The inventors have found that there is a balance between pH and conductivity. Increasingly lowering the pH to less than the isoelectric point of a protein generally increases the positive charge on the protein. That increase in positive charge counteracts the charge shielding effect of increasing the conductivity. Therefore, to operate at the high conductivity natural to milk and whey, the inventors have found that the pH of the solution can be lowered to ameliorate charge shielding.

Thus, in accordance with the present invention, the inventors proposed adjusting the conductivity to a range of about 3-10 mS/cm and a pH of 3-4.5. This will avoid any significant charge shielding, but can be accomplished in a fairly straightforward manner. If they had chosen to lower the conductivity to, say, less than 2 mS/cm, then charge shielding would be minimal. That would enhance the effect of electrostatic repulsion and one would not need to go reduce substantially pH, i.e., the difference between pH and pI could have been smaller. The bigger the difference between pH and pI the bigger the net charge on the protein. Reducing the conductivity to less than 2 mS/cm would have lessened the cost to reduce the pH, but would have increased more the cost for conductivity reduction. It is generally less expensive to reduce the pH than to reduce the conductivity of the whey or milk serum.

By choosing to work at the natural conductivity of milk and whey, the issue was made more difficult because of enhanced charge shielding—charge shielding negates the advantages of a charged ultrafiltration. To ameliorate this problem, the inventors adjusted the pH to below the value one might have been able to use were one working at a lower conductivity. This increased the net charge on the proteins to be rejected from the membrane while maintaining the natural conductivity of milk and whey.

One can adjust the conductivity independent of the pH. Adding sodium chloride or another neutral salt increases the conductivity without changing the pH, and adding deionized water lowers the conductivity without changing the pH.

V. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Figure 1:
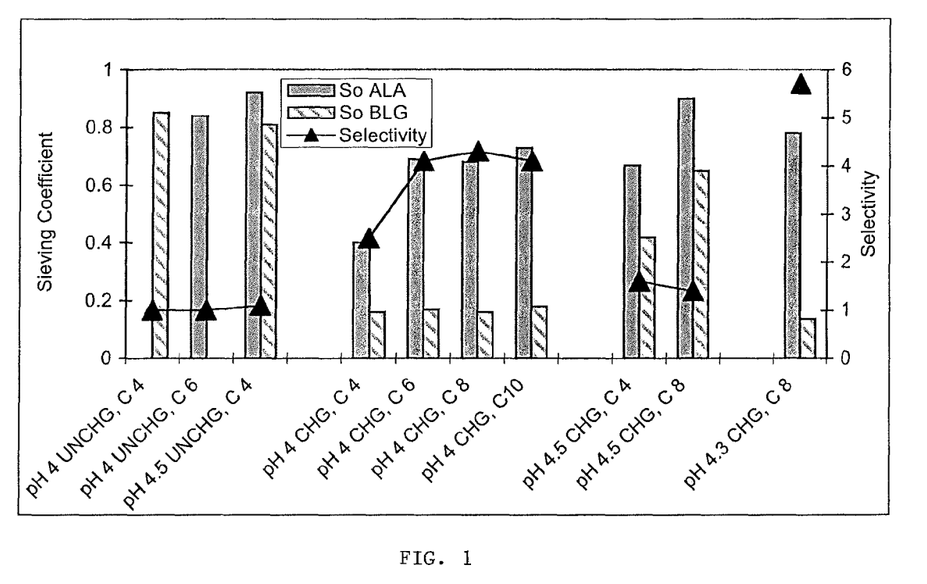
FIG. 1. Effect of charge, pH and conductivity.

A 300 kDa cross-flow ultrafiltration membrane (50 cm$^2$ regenerated cellulose membrane, Pellicon XL, Millipore, Bedford, Mass., USA) was used to separate alpha-lactalbumin (ALA) and beta-lactoglobulin (BLG) to illustrate the effect of membrane charge, and solution pH and conductivity on the observed sieving coefficient ($S_o$) and selectivity of the separation (FIG. 1). An uncharged 300 kDa ultrafiltration membrane should not retain ALA (14.4 kDa) and BLG (18.6 kDa) because both proteins are at least ten times smaller than the rated membrane pore size. As expected, this is what was observed. Most of the ALA and BLG freely passed through the uncharged membrane, with only about 8 to 16% of the ALA and 15 to 19% of the BLG retained at pH 4.0 to 4.5 and conductivity 4 to 6 mS/cm ($S_o$ ALA≈0.88, $S_o$ BLG≈0.83). Selectivity of the separation is defined as the ratio of the sieving coefficients and no separation occurs for a selectivity of one. The selectivity of the uncharged ultrafiltration membrane for ALA and BLG was about 1.0. Thus, ALA and BLG were not significantly retained by the 300 kDa uncharged ultrafiltration membrane, and it failed to separate one protein from the other.

A positive charge was covalently bonded to the 300 kDa ultrafiltration membrane surface using (3-bromopropyl) trimethylammonium bromide following the procedure of Bushan and Etzel (2009) and van Reis (2006). Placing a positive charge on the 300 kDa membrane dramatically increased the selectivity of the separation compared to the uncharged membrane by 330% (FIG. 1). Furthermore, increasing the solution conductivity increased the sieving coefficient for ALA, but not for BLG. This increased the selectivity of the separation by 70% for the charged membrane (from 2.5 to 4.3) as conductivity increased from 4 to 8 mS/cm.

Increasing pH from 4.0 to 4.5 increased the sieving coefficients for both ALA and BLG, and decreased the selectivity. However, an intermediate pH of 4.3 was found to result in the best separation, because it increased the selectivity when compared to pH 4.0 or 4.5. Thus, the best conditions for separation of ALA from BLG were found to be pH 4.3 and conductivity 8 mS/cm using a positively-charged 300 kDa ultrafiltration membrane. Under these conditions, the selectivity was 5.7 using the charged ultrafiltration membrane; 470% greater than for the uncharged membrane.

If ALA is the protein of interest, and the other species is BLG, then adjusting the solution to pH 4.3, near the isoelectric point of ALA (pI 4.4), but substantially less than the isoelectric point of BLG (pI 5.1), thereby rendering a net charge of about zero on the ALA and a substantial positive charge on the BLG, and adjusting the solution conductivity to about 8 mS/cm, the protein of interest ALA (14.4 kDa) could be fractionated from BLG (18.6 kDa) using a charged ultrafiltration membrane having a pore size rating at least 100 kDa above, or ten-fold greater than the protein species other than the protein of interest. This was not possible using an uncharged ultrafiltration membrane, because both of the proteins freely passed through the uncharged membrane because it had a pore size rating more than ten times larger than either of the proteins. What is surprising about this result is that by simply adding a charge to the ultrafiltration membrane, proteins more than ten times smaller than the rated pore size of membrane can be fractioned from each other.

Example 2

Figure 2:
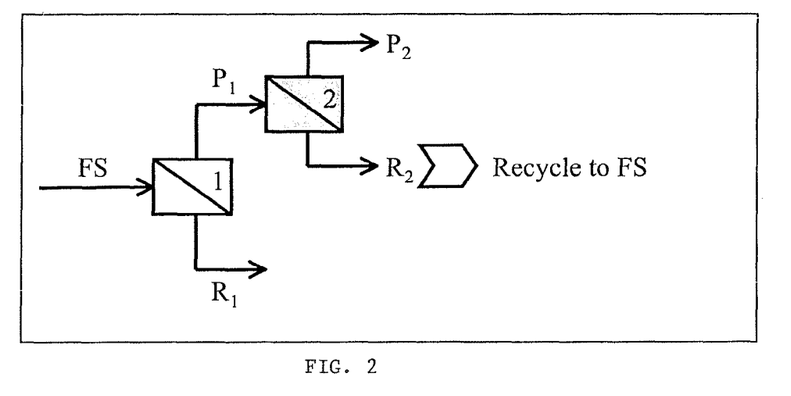
FIG. 2. Flow diagram for two-stage charged ultrafiltration membrane.

The conditions of Example 1 can be used on a feed stream (FS) to make a first permeate stream (P1) enriched in the protein of interest (ALA) and a first retentate stream (R1) enriched in the other species (BLG). As shown in FIG. 2, a second charged ultrafiltration membrane can be used on the first retentate stream to make a second permeate stream (P2) and a second retentate stream (R2). This staging of the charged ultrafiltration membranes has the advantage of increasing purity and offering the opportunity to recycle intermediate streams to the feed stream (FS) to reduce waste.

Figure 3:
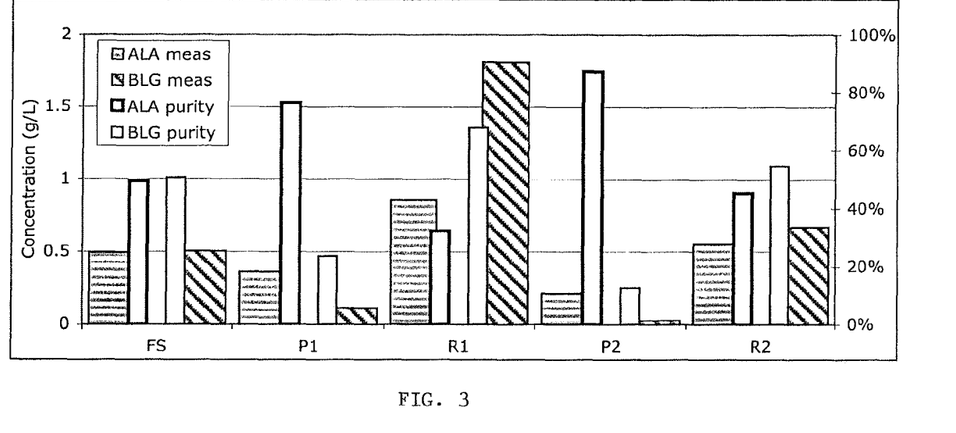
FIG. 3. Two-stage charged ultrafiltration of ALA and BLG.

For example, a feed stream containing 0.5 g/L each of ALA and BLG was adjusted to pH 4.3, conductivity 8 mS/cm and fed to a 300 kDa charged ultrafiltration membrane (FIG. 3). The feed stream had 50% purity each for ALA and BLG. The first permeate stream (P1) was higher in ALA purity (77%) and the first retentate stream (R1) was higher in BLG purity (68%) than the feed stream (FS). The first permeate stream was fed to a second 300 kDa charged ultrafiltration membrane. The second permeate (P2) was further enriched in ALA (87% purity) and the second retentate stream (R2) had a composition and purity about the same as the feed stream, and could have been be recycled back to the feed stream to recover the proteins and reduce waste as shown in FIG. 3.

Figure 4:
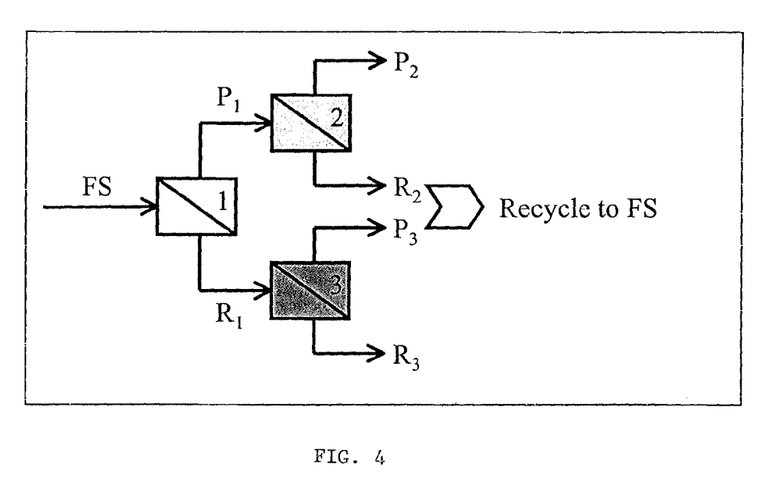
FIG. 4. Flow diagram for three-staged charged ultrafiltration membrane.

The first retentate stream (R1) could be subjected to a third charged ultrafiltration to make a third retentate (R3) and a third permeate (P3) as shown in FIG. 4. The third retentate in this case would be enriched in BLG compared to the first retentate, and the third permeate would have a composition similar to the feed stream, and could be recycled back to the feed stream to recover the proteins and reduce waste.

Example 3

Milk serum protein (MSP) was fractionated using a charged 300 kDa ultrafiltration membrane. Skim milk was subjected to microfiltration to remove caseins and residual lipids, and form the MSP solution. The MSP solution was adjusted to pH 4.3 without adjustment of the conductivity. The natural conductivity of the MSP solution was about 8-10 mS/cm. It was desired to fractionate the MSP at this natural conductivity without the use of either electrodialysis, diafiltration, dilution by addition of de-ionized water or other methods to lower the conductivity. Using the MSP at the natural conductivity is less expensive than the use of any of the preceding methods. It was also desired to avoid the dissolution of dried MSP in buffer to eliminate the expensive steps of concentration and drying of the MSP, and the expense of addition and then disposal of the buffer salts. By using the natural MSP solution that was made directly from the microfiltration of skim milk, the cost of manufacture and the amount of waste generation are less than these other methods.

Figure 5:
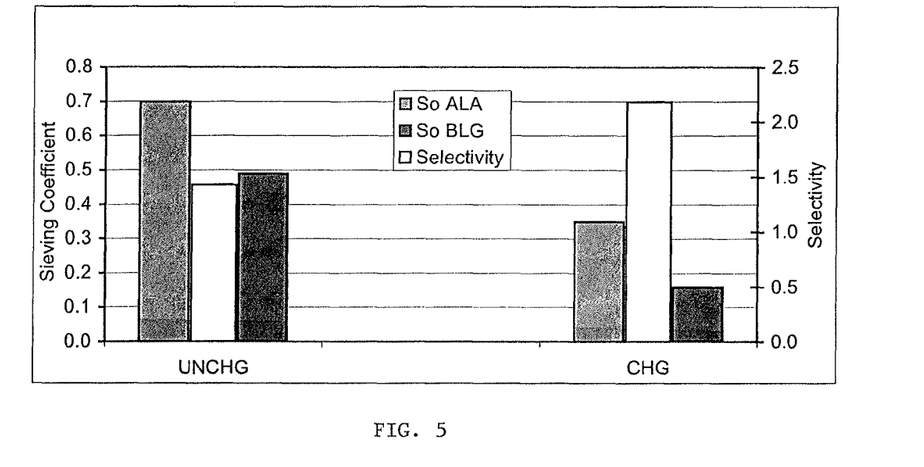
FIG. 5. Milk serum protein fractionation using a positively-charged 300 kDa ultrafiltration membrane.

As shown in FIG. 5, the sieving coefficients for ALA and BLG using the 300 kDa uncharged (UNCHG) ultrafiltration membrane were not statistically significantly different (p>0.05). The selectivity was about 1.4, meaning there was little to no separation of ALA and BLG. Placing a positive charge on the 300 kDa ultrafiltration membrane (CHG) increased the selectivity by 66% to a value of 2.2. To further increase the selectivity, the temperature was increased from 22 to 40° C. This increased the selectivity of the MSP separation from 2.2 to 4.2.

Figure 6:
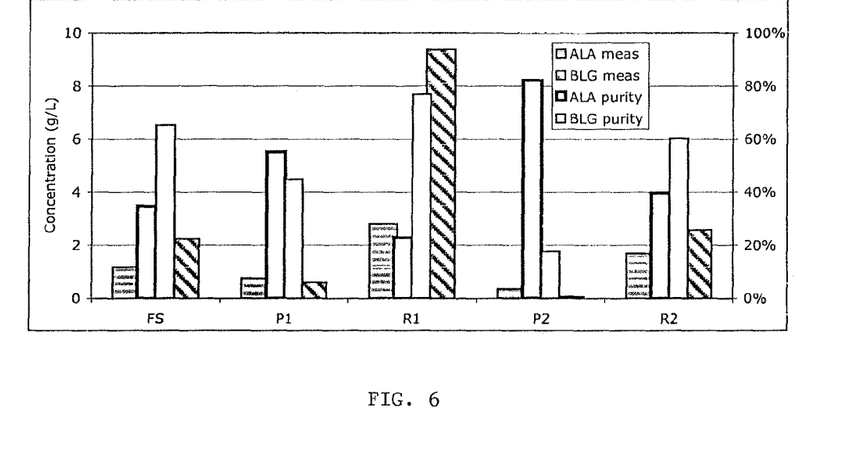
FIG. 6. Two-stage charged ultrafiltration of MSP.

A two stage separation was conducted using MSP at 40° C. and pH 4.3 (FIG. 6). The MSP feed stream contained 1.2 g/L ALA at 35% purity and 2.2 g/L BLG at 65% purity. The first permeate stream (P1) was higher in ALA purity (55%) and the first retentate stream (R1) was higher in BLG purity (77%) compared to the feed stream. The first permeate stream was fed to a second 300 kDa charged ultrafiltration membrane. The second permeate (P2) was further enriched in ALA (82% purity) and the second retentate stream (R2) had a composition and purity about the same as the feed stream, and could have been recycled back to the feed stream to recover the proteins and reduce waste. Thus, ALA and BLG were fractionated from MSP without the addition of buffer salts or the need to reduce the solution conductivity.

Example 4

Figure 7:
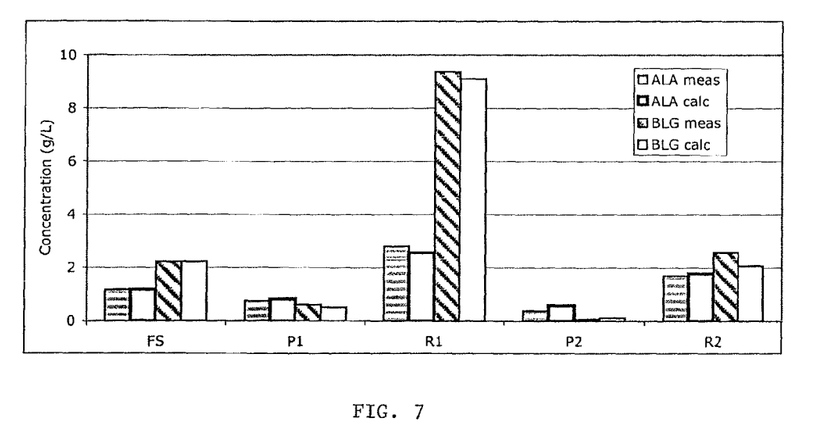
FIG. 7. Two-stage charged ultrafiltration of MSP.

The impacts of multiple stages and recycle on concentrations and purity can be illustrated using a mass balance calculation. The measured concentrations for the two-stage system without recycle were compared to the mass balance calculations (FIG. 7). Measured values for the sieving coefficients at 40° C. were used in the calculation (So ALA=0.520, $S_o$ BLG=0.125). The mass balance calculations were not substantially different than the experimental measurements.

Figure 8:
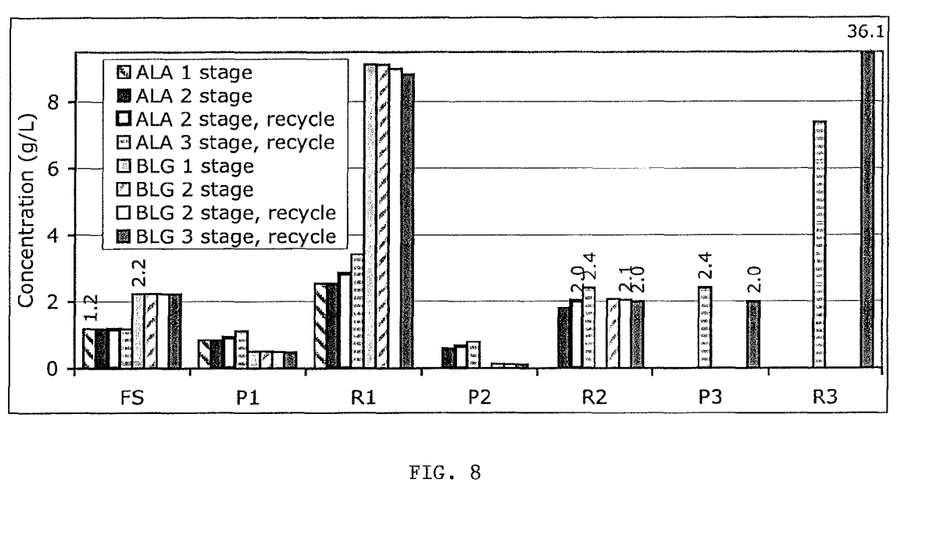
FIG. 8. Stages with and without recycle.

Four different flow configurations were evaluated: (1) one stage, (2) two stage, (3) two stage with recycle, and (4) three stage with recycle (FIG. 8). Concentrations of each stream for a feed stream of MSP were determined by mass balance. In the two stage system, the first permeate (P1) was fed to a second membrane to form a second permeate (P2) and second retentate (R2). For two stages with recycle, stream R2 was recycled back to the feed stream. The composition of stream R2 was similar to the composition of the feed stream. The three stage system was the same as the two stage system in the handling of stream P1, but added that the first retentate (R1) was fed to a third membrane to form a third permeate (P3) and third retentate (R3). Streams R2 and P3 were recycled back to the feed stream in the calculation for the three cycle system because the compositions were similar and it reduced waste.

Purity of ALA increased by adding more stages and recycle (Table 1). Purity of BLG was less affected, but was highest for three stages with recycle. The ALA purity of the feed stream was 35% compared to a purity of 88% in the top of the three-stage system with recycle. This example shows that positively-charged ultrafiltration membranes can be used to make dairy protein fractions of chromatographic purity without the need for sophisticated chromatography equipment or water or buffers. The invention can be practiced using ultrafiltration membrane equipment already in place in essentially every dairy processing facility worldwide.

TABLE 1

Purity for Different Flow Configurations

| | ALA purity in top | BLG purity in bottom |
|---|---|---|
| 1 stage | 62% | 78% |
| 2 stage no recycle | 83% | 78% |
| 2 stage with recycle | 86% | 76% |
| 3 stage with recycle | 88% | 83% |

Example 5

A 300 kDa positively-charged ultrafiltration membrane was used to separate glycomacropeptide (GMP) from alpha-lactalbumin (ALA) and beta-lactoglobulin (BLG) in Swiss cheese whey at pH 3.0 and conductivity 4 mS/cm. It was expected that GMP (8.6 kDa, pI<3.8) would be smaller and less charged than the other major proteins in whey that are larger and more basic ALA (14.4 kDa, PI=4.4) and BLG (18.6 kDa, pI=5.1). Therefore, GMP might be expected to freely pass through a positively-charged ultrafiltration membrane while ALA and BLG would not. What was not expected was that it would be possible to use a 300 kDa membrane pore size. It was surprising to observe that both ALA and BLG, which are at least ten times smaller than the rated membrane pore size, were highly retained by the 300 kDa charged membrane. The sieving coefficients were: $S_o$ GMP=0.43, $S_o$ BLG=0.105, and $S_o$ ALA=0.133. The positively-charged membrane retained about 90% of the BLG and 87% of the ALA. The protein of interest (GMP) more freely passed through the membrane.

Figure 9:
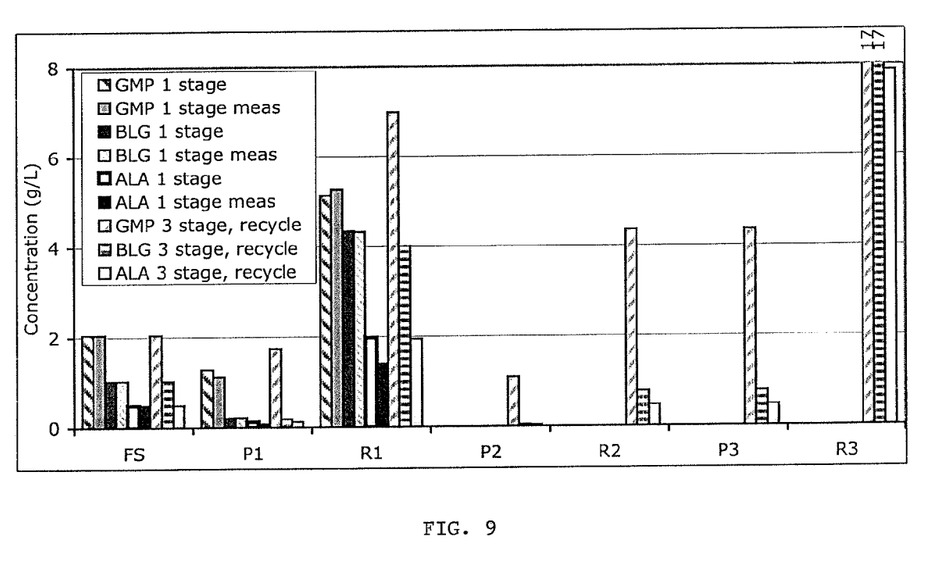
FIG. 9. Glycomacropeptide (GMP) separation from Swiss cheese whey.

For a single stage, the measured concentrations of GMP, BLG, and ALA were compared to those from the mass balance calculation (FIG. 9). Measured and calculated concentrations were not significantly different. The calculated concentrations for a three stage configuration with recycle of streams P3 and R2 revealed an increase in purity of the GMP from 57% in the feed stream to 80% in the permeate (P1) of the one-stage system, and 94% in the permeate (P2) of the three stage system.

This example illustrates that if GMP is the protein of interest, and the other species are the other major whey proteins BLG and ALA, then adjusting the cheese whey solution to pH 3.0, near the isoelectric point of GMP, but substantially less than the isoelectric point of BLG and ALA, renders a net charge of about zero on the GMP and a substantial positive charge on the BLG and ALA. Using a charged ultrafiltration membrane having a pore size rating at least 100 kDa above, or ten-fold greater than the protein species other than the protein of interest, means that the protein of interest GMP (8.6 kDa) could be collected in the permeate and separated from BLG (18.6 kDa) and ALA (14.4 kDa) which are collected in the retentate.

In the previous examples, ALA was the protein of interest and the protein mixture was adjusted to pH 4.3 to render a net charge of about zero on ALA while the other proteins carried a substantial net positive charge. This allowed ALA to freely pass through the 300 kDa positively charged ultrafiltration membrane while the other proteins did not. In the present example, ALA was not the protein of interest (GMP was) and by adjusting the protein mixture to pH 3.0, ALA was substantially rejected by the same 300 kDa charged ultrafiltration membrane that allowed ALA to freely pass through at pH 4.3.

BLG was not the protein of interest in any of the examples. At both pH 4.3 and pH 3.0, BLG was substantially rejected by the 300 kDa positively charged ultrafiltration membrane because the isoelectric point of BLG (pI 5.1) was greater than either pH value, and BLG carried a substantial net positive charge. If BLG was the protein of interest, then the protein mixture would be adjusted to about pH 5.1 to render a net charge of about zero on the BLG while the other proteins carry a substantial net negative charge. This would allow BLG to freely pass through a 300 kDa negatively charged ultrafiltration membrane while the other proteins would not.

What is surprising about these results is that by using a charged ultrafiltration membrane, proteins more than ten times smaller than the rated pore size of membrane can be fractioned from each other. This discovery offers the advantage of making dairy protein fractions of chromatographic purity without the need for sophisticated chromatography equipment or water or buffers. Furthermore, the water flux of a 300 kDa membrane is more than 60 times greater than the flux of a 10 kDa membrane; the pore size one would expect to be needed to fractionate proteins of size 8.6 to 18.6 kDa. Higher flux corresponds to faster production rates for protein purification and a dramatically lower cost of manufacture.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.
U.S. Pat. No. 4,824,568
U.S. Pat. No. 4,849,106
U.S. Patent Publn. 2002/0185440
U.S. Patent Publn. 2003/0178368 A1

What is claimed is:

1. A method for fractionating a protein mixture, the method comprising:
   (a) adjusting the pH of the protein mixture based on the isoelectric point of a protein of interest in the protein mixture, thereby rendering a net charge of about zero on the protein of interest;
   (b) adjusting conductivity of the protein mixture such that proteins other than the protein of interest are rejected by a charged ultrafiltration membrane; and
   (c) contacting said mixture with a charged ultrafiltration membrane to achieve a first permeate and a first retentate, wherein said ultrafiltration membrane has a pore size at least 10× greater than the molecular mass of at least one of the proteins other than the protein of interest, and has a pore size of between about 86 kDa and about 1,600 KDa, wherein said first permeate comprises an increased ratio of the protein of interest as compared to the protein mixture.

2. The method of claim 1, wherein the protein mixture is a milk protein or a whey protein mixture.

3. The method of claim 1, further comprising subjecting the first permeate to a second charged ultrafiltration to achieve a second permeate and a second retentate.

4. The method of claim 1, further comprising subjecting the first retentate to a second charged ultrafiltration to achieve a second retentate and a second permeate.

5. The method of claim 3, wherein said second retentate is recycled into another protein mixture for additional charged ultrafiltration.

6. The method of claim 4, wherein said second permeate is recycled into another protein mixture for additional charged ultrafiltration.

7. The method according to claim 1, wherein the ultrafiltration achieves a purity of about 60%, 65%, 70%, 75%, 80%, 85%, 90%, 95% or 99%.

8. The method according to claim 1, wherein the ultrafiltration achieves a yield of about 60%, 65%, 70%, 75%, 80%, 85%, 90%, 95% or 99%.

9. The method of claim 1, wherein the ultrafiltration membrane is positively-charged or negatively-charged.

10. The method of claim 1, wherein the conductivity is adjusted to 3-10 mS/cm, in particular to 3-6 mS/cm.

11. The method of claim 1, wherein GMP is separated from ALA, IgG, or BLG; or wherein ALA is separated from IgG or BLG; or wherein BLG is separated from IgG.

12. The method of claim 1, wherein said charged ultrafiltration is effected by a multistage cross-flow positively-charged of ultrafiltration membrane.

13. The method according to claim 3, wherein the ultrafiltration achieves a purity of about 60%, 65%, 70%, 75%, 80%, 85%, 90%, 95% or 99%.

14. The method according to claim 4, wherein the ultrafiltration achieves a purity of about 60%, 65%, 70%, 75%, 80%, 85%, 90%, 95% or 99%.

15. The method according to claim 3, wherein the ultrafiltration achieves a yield of about 60%, 65%, 70%, 75%, 80%, 85%, 90%, 95% or 99%.

16. The method according to claim 4, wherein the ultrafiltration achieves a yield of about 60%, 65%, 70%, 75%, 80%, 85%, 90%, 95% or 99%.

17. A method for separating glycomacropeptide (GMP) from alpha-lactalbumin (ALA), GMP from immunoglobulin G (IgG), GMP from beta-lactoglobulin (BLG), ALA from IgG, or BLG from IgG, the method comprising:
   (a) adjusting pH of a protein mixture comprising two or more of GMP, ALA, GLG, or IgG based on an isoelectric point of one of GMP, ALA, GLG, or IgG present in the protein miture, thereby rendering a net charge of about zero on one of GMP, ALA, GLG, or IgG present in the protein mixture;
   (b) adjusting conductivity of the protein mixture such that proteins selected from the group consisting of GMP, ALA, BLG, and IgG, other than the protein of step (a) that has a net charge of about zero, are rejected by a charged ultrafiltration membrane; and
   (c) contacting the protein mixture of step (b) with a charged ultrafiltration membrane tp acjoeve a forst permeate and a first retentate, wherein the ultrafiltration membrane has a pore size at least 10× greater than the molecular mass of at least one of GMP, ALA, BLG, or IgG, other than the protein of step (a) that has a net charge of about zero, and has a pore size of between about 86 kDa and about 1,600 kDa, wherein the first permeate comprises an increased ratio of the protein of step (a) that has a net charge of about zero as compared to the protein mixture.

\* \* \* \* \*

UNITED STATES PATENT AND TRADEMARK OFFICE
CERTIFICATE OF CORRECTION

| | | |
|---|---|---|
| PATENT NO. | : 10,638,775 B2 | Page 1 of 1 |
| APPLICATION NO. | : 16/054196 | |
| DATED | : May 5, 2020 | |
| INVENTOR(S) | : Mark R. Etzel et al. | |

It is certified that error appears in the above-identified patent and that said Letters Patent is hereby corrected as shown below:

In the Claims

Column 13, Line 54, "based on the" should read --based on an--;
    Line 61, "contacting said mixture" should read --contacting the mixture--;
    Line 63, "wherein said ultrafiltration" should read --wherein the ultrafiltration--;
    Line 67, "wherein said first permeate" should read --wherein the first permeate--.

Column 14, Line 2, "the protein mixture." should read --the protein mixture;--;
    Line 3, insert the following paragraph to the end of Claim 1:
        --wherein the protein mixture comprises one or more of glycomacropeptide (GMP), alpha-lactalbumin (ALA), immunoglobulin G (IgG), and/or beta-lactoglobulin (BLG).--;
    Line 11, "wherein said second retentate" should read --wherein the second retentate--;
    Line 14, "wherein said second permeate" should read --wherein the second permeate--;
    Line 30, "wherein said charged" should read --wherein the charged--;
    Line 50, "GLG" should read --BLG--;
    Line 51, "GLG" should read --BLG--;
    Line 53, "GLG" should read --BLG--;
    Line 61, "tp acjoeve a forst" should read --to achieve a first--.

Signed and Sealed this
Twenty-third Day of August, 2022

Katherine Kelly Vidal
*Director of the United States Patent and Trademark Office*